United States Patent
Kim et al.

(10) Patent No.: US 7,929,476 B2
(45) Date of Patent: Apr. 19, 2011

(54) PACKET ACCESS ROUTER AND RANGING METHOD USING THE SAME IN MOBILE COMMUNICATION SYSTEM

(75) Inventors: Ju-Hee Kim, Daejeon (KR); Shang-Lim Shin, Seoul (KR); Kyung-Soo Kim, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 852 days.

(21) Appl. No.: 11/756,304

(22) Filed: May 31, 2007

(65) Prior Publication Data

US 2008/0137582 A1 Jun. 12, 2008

(30) Foreign Application Priority Data

Dec. 8, 2006 (KR) .................. 10-2006-0124583

(51) Int. Cl.
*H04B 7/14* (2006.01)
(52) U.S. Cl. .................. 370/315; 370/329; 455/450
(58) Field of Classification Search .......... 370/315–327, 370/328–329, 335, 342; 455/450–454
See application file for complete search history.

(56) References Cited

U.S. PATENT DOCUMENTS

| | | | |
|---|---|---|---|
| 7,515,559 B2* | 4/2009 | Koo et al. .................. 370/328 |
| 2005/0192011 A1* | 9/2005 | Hong et al. .................. 455/440 |
| 2007/0076684 A1* | 4/2007 | Lee et al. .................. 370/350 |
| 2007/0201392 A1* | 8/2007 | Ramachandran .......... 370/315 |
| 2008/0031182 A1* | 2/2008 | Maheshwari et al. ....... 370/320 |
| 2008/0108355 A1* | 5/2008 | Oleszcsuk .................. 455/442 |
| 2008/0117854 A1* | 5/2008 | Saifullah et al. ............ 370/315 |
| 2008/0259857 A1* | 10/2008 | Zheng .......................... 370/329 |
| 2008/0285500 A1* | 11/2008 | Zhang et al. ............... 370/315 |
| 2009/0073916 A1* | 3/2009 | Zhang et al. ............... 370/315 |
| 2009/0303918 A1* | 12/2009 | Ma et al. ..................... 370/315 |

FOREIGN PATENT DOCUMENTS

| | | |
|---|---|---|
| KR | 1019990034353 A | 5/1999 |
| KR | 1020030084243 A | 1/2003 |
| KR | 1020060029760 A | 4/2006 |
| KR | 1020060080101 A | 7/2006 |
| KR | 1020060119655 A | 11/2006 |
| KR | 1020070030683 A | 3/2007 |
| KR | 1020070035869 A | 4/2007 |
| KR | 1020070054969 A | 5/2007 |

* cited by examiner

*Primary Examiner* — Kent Chang
*Assistant Examiner* — Marcus Hammonds (57) ABSTRACT

The present invention relates to a packet access router and a ranging method using the same in a mobile communication system. In the mobile communication system to which the packet access router is introduced, a better initial access process and a periodic ranging process are performed so as to accurately transmit data to the access point irrespective of the condition of whether an access terminal is provided in the packet access router region or not. When a ranging code is received, it is accurately determined whether the ranging code is directly received from the access terminal or it is received through the packet access router, and a method for performing a ranging control on the access terminal and a packet access router when the ranging code is transmitted to the access point through the packet access router. Therefore, the coverage of the access point is increased and the data throughput is improved. Also, system performance can be enhanced through efficient power control on the access terminal provided out of the access point region.

5 Claims, 9 Drawing Sheets

| Syntax | Size | Note |
|---|---|---|
| UL-Extended-IE() { | | |
| Extended-UIUC | 4 | Value = 0x0A |
| Length | 4 | Value = 4 |
| OFDMA Symbol offset | 8 | |
| Subchannel offset | 7 | |
| No. OFDMA Symbols | 7 | |
| No. Subchannels | 7 | |
| Ranging Method | 2 | |
| Dedicated ranging indicator | 1 | |
| } | | |

PACKET ACCESS ROUTER AND RANGING METHOD USING THE SAME IN MOBILE COMMUNICATION SYSTEM

CROSS-REFERENCE TO RELATED APPLICATION

This application claims priority to and the benefit of Korean Patent Application No. 10-2006-0124583 filed in the Korean Intellectual Property Office on Dec. 8, 2006, the entire contents of which are incorporated herein by reference.

BACKGROUND OF THE INVENTION (a) Field of the Invention

The present invention relates to a mobile communication system, and in particular, it relates to a packet access router and a ranging method using the same.

(b) Description of the Related Art

In general, in a portable Internet system classified as one type of mobile communication system, when a packet access router amplifies and transmits power of a ranging region for receiving a channel and a plurality of access terminals provided to the packet access router perform ranging, an access point cannot determine whether the access terminals have transmitted ranging codes through the packet access router or have directly received the codes transmitted from the access terminals.

One method for transmitting a ranging code for ranging to the access point is a method for a packet access router to generate a message on the ranging code and to then transmit the message to the access point. In the above-noted method, the access point stands by for receiving a repeated ranging information message, compares the message with a ranging code received in the previous frame to determine whether to perform a repeating process, and determines a ranging response message transmission method.

In this instance, it is needed to allocate a resource for an uplink bandwidth of a corresponding packet access router when the packet access router attempts to transmit a ranging information message to the access point. Therefore, a fixed resource allocation on the uplink bandwidth is generated in order for the packet access router to transmit the message, and a delay caused by the resource allocation, a problem of unnecessary fixed allocation of resource usage, and a ranging processing time delay are problematically generated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a packet access router for a mobile terminal to fluently perform ranging in a mobile communication system and a ranging method thereof.

In one aspect of the present invention, a method for ranging a access terminal by using a packet access router in a mobile communication system includes: receiving a ranging information message from a packet access router, the ranging information message including a ranging code; checking whether have received a ranging code from an access terminal corresponding to the ranging code included in the received ranging information message; and broadcasting a ranging response message to the packet access router when having received the same ranging code.

In another aspect of the present invention, a ranging method for repeating a ranging information message provided by an access terminal to an access point in a mobile communication system includes: receiving a ranging information message including a first ranging code from the access terminal through an uplink frame, duplicating the first ranging code, and generating a second ranging code; including the second ranging code into another region other than the region in which the first ranging code is positioned in the uplink frame including the first ranging code, and transmitting a result to the access point; and receiving a ranging response message from the access point, and transmitting a ranging response message on the first ranging code and the second ranging code to the access terminal.

In another aspect of the present invention, a packet access router includes: a channel information generator for receiving a ranging information message from an access terminal, the ranging information message being included in an uplink frame; a ranging code duplicator for duplicating a first ranging code included in a first region of the uplink frame received from the access terminal, and generating a second ranging code; and a frame allocator for allocating the second ranging code to a second region of the uplink frame.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" and "comprising", will be understood to imply the inclusion of stated elements but not the exclusion of any other elements.

Figure 1:
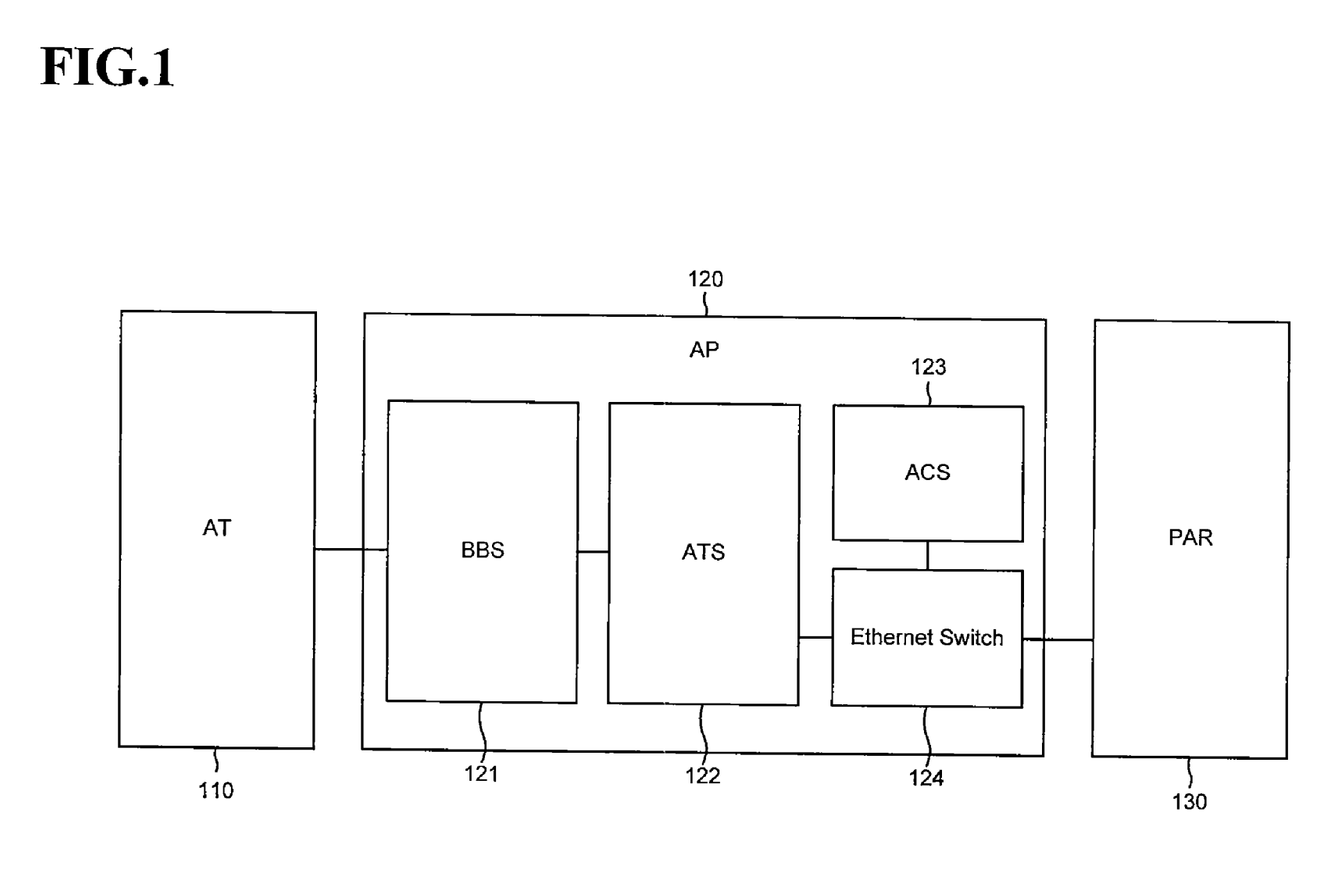
FIG. 1 is a configuration diagram for a general portable Internet system.

FIG. 1 is a schematic diagram of a general portable Internet system.

As shown in FIG. 1, in the general portable Internet system, an access terminal (AT) 110 and a packet access router (PAR) 130 for performing an external agent function are connected to an access point (AP) 120.

The access point 120 includes a baseband subsystem (BBS) 121, an access traffic subsystem (ATS) 122, an access controller subsystem (ACS) 123, and an Ethernet switch (ES) 124. The BBS 121 performs a radio section transmitting/receiving function, and the ATS 122 processes traffic and controls radio link transmitting/receiving. The ACS 123 controls a resource of each access terminal 110 and also controls cells, and the Ethernet switch 124 reads another user's address from among data frames to be transmitted from the access terminal 110 and transmits a data frame to the corresponding AT. The Ethernet switch 124 connects the packet access router 130, the ATS 122, and the ACS 123.

The configuration of the access terminal 110 for performing a ranging function in the portable Internet system will now be described with reference to FIG. 2.

Figure 2:
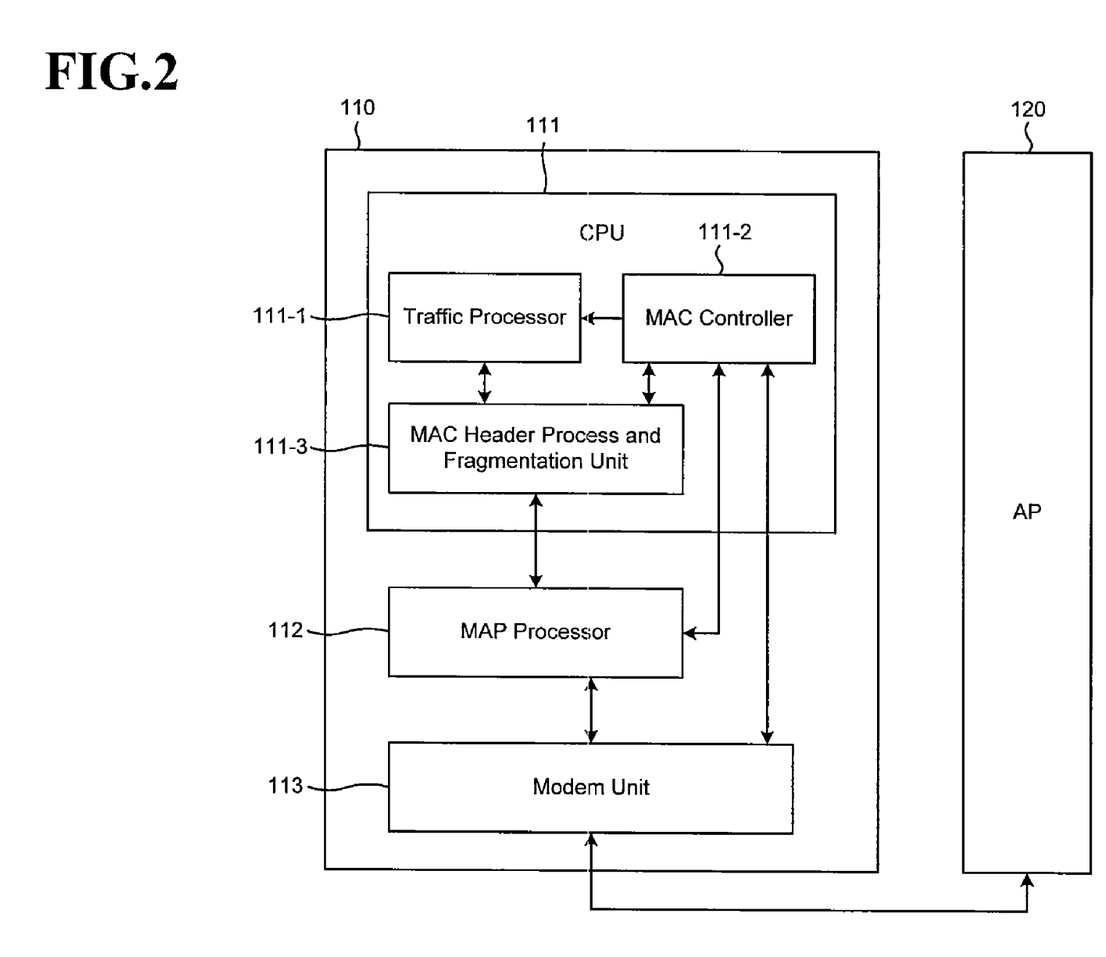
FIG. 2 is a configuration diagram of an access terminal for performing a ranging function in a general portable Internet system.

FIG. 2 is a configuration diagram of an access terminal for performing a ranging function in the portable Internet system.

As shown in FIG. 2, to perform the ranging function in the portable Internet system, the access terminal 110 includes a central processing unit (CPU) 111, a MAP processor 112 for processing the MAP, and a modem unit 113 for controlling ranging parameters, and the CPU 111 includes a traffic processor 111-1, a MAC controller 111-2, and a MAC header process and fragmentation unit 111-3.

The MAC controller 111-2 acquires a code division multiple access (CDMA) code and a back off parameter for performing ranging through a user data document (UDD) broadcast to the access point 120. The MAC controller 111-2 receives information on the resource allocated for performing ranging from the MAP processor 112 for performing the uplink MAP (UL-MAP). The MAC controller 111-2 transmits the CDMA code and resource information for transmitting the same to the modem unit 113 to transmit the CDMA code to the access point 120 directly or to the access point 120 through the packet access router 130.

The access terminal 110 receives a CDMA allocation IE (a response to the CDMA code) from the access point 120 within a predetermined time. When the code received from the access point 120 corresponds to the code transmitted by the access terminal 110, the access terminal 110 transmits a bandwidth request header to the access point 120 directly or to the access point 120 through the packet access router 130. When the response to the bandwidth request code transmitted to the access point 120 by the access terminal 110 exceeds a predetermined response time, the access terminal 110 retransmits a bandwidth request header after a back off to the access point 120. The access point 120 analyzes the received bandwidth request header to allocate an uplink bandwidth.

Figure 3A:
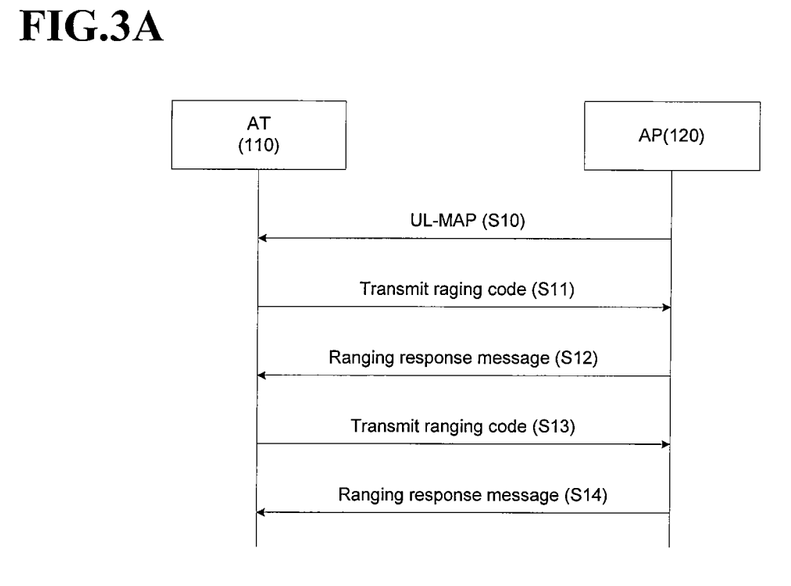
FIG. 3A is a flowchart for a general periodic ranging process.
Figure 3B:
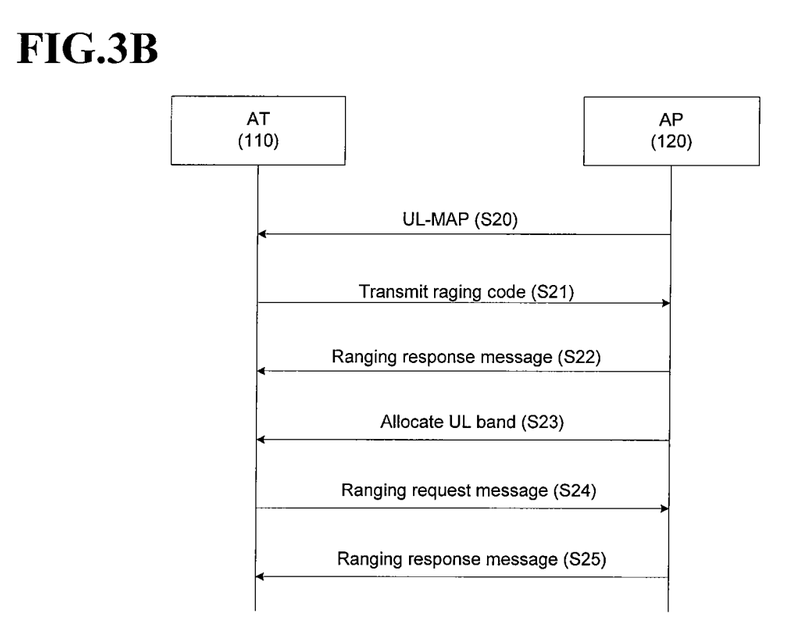
FIG. 3B is a flowchart for a general initial access ranging process.

The ranging process executed between the access terminal 110 and the access point 120 will now be described with reference to FIG. 3A and FIG. 3B. FIG. 3A is a flowchart for a periodical ranging process, and FIG. 3B is a flowchart for an initial access ranging process. The periodic ranging is performed at regular time intervals so as to control power, timing, and frequency offset that are variable as the access terminal 110 moves.

FIG. 3A is a flowchart for a general periodic ranging process.

As shown in FIG. 3A, the access terminal 110 receives an uplink channel descriptor (UCD) message from the access point 120, and acquires a ranging code used for periodical ranging and modulation and coding information from the UCD message. Also, the access terminal 110 receives an UL-MAP from the access point 120 (S10), and acquires a ranging channel used for periodical ranging and a ranging slot from the UL-MAP.

The access terminal 110 selects a random code from among a set of periodical ranging codes and transmits the same to the ranging slot (S11). When identifying the ranging code transmitted by the access terminal 110, the access point 120 broadcasts the received ranging code, the corresponding ranging slot, and timing/frequency/power control parameters through a ranging response (RNG_RSP) message (S13).

The access terminal 110 controls the timing/frequency/power offset through a ranging response message corresponding to the ranging code and the ranging slot transmitted by the access terminal 110. A ranging slot includes two symbols in the initial ranging process shown in FIG. 4, and a ranging slot includes a symbol in the periodical ranging.

In this instance, on finding a broadcasting message allocation IE from the access point 120 from among the IEs of the DL-MAP within a predetermined time, the access terminal 110 receives a corresponding burst to compare the ranging code transmitted by the access terminal 110 from among the ranging response message and the ranging code included in the ranging response message. On finding the broadcasting message allocation IE including the same ranging code according to the comparison result, the access terminal 110 performs a ranging control on the corresponding message. On finding no ranging response message including the ranging code for a predetermined time, the access terminal 110 retransmits the ranging code after a back off (S13).

When the status value of the ranging response message transmitted by the access point 120 indicates 'Continue,' the access terminal 110 stores the status value as 'Continue.' In this instance, the access point 120 repeats the periodic ranging process on the access terminal 110 in the case of a next UL-MAP transmission. Therefore, the access point 120 transmits the UL-MAP to the access terminal 110, and the access terminal 110 acquires a ranging channel and a ranging slot used for periodical ranging from the UL-MAP.

When the status value of the ranging response message transmitted by the access point 120 indicates a 'Success,' the access terminal 110 stores the status value as 'Success' to broadcast the ranging response message to the access terminal 110 (S14). In this instance, the access point 120 terminates the periodic ranging process of the access terminal 110. The periodic ranging is periodically performed by the access terminal 110 in the case of data transmission, and hence, the access point 120 and the access terminal 110 repeat the periodic ranging process at predetermined time intervals.

An initial transmission ranging process will now be described with reference to FIG. 3B.

FIG. 3B is a flowchart for the initial access ranging process.

As shown in FIG. 3B, when system synchronization is performed between the access terminal 110 and the access point 120, the access point 120 transmits a DL-MAP message to the access terminal 110. After transmitting the DL-MAP message, the access point 120 transmits a UCD message to the access terminal 110. In this instance, the UCD message includes information on an uplink channel identifier, a size of a mini slot of an uplink physical channel counted by the access point 120, an initial back off window size, and a final back off window size.

The access point 120 transmits a UCD message to the access terminal 110 and then transmits a UL-MAP message to the access terminal 110 (S20). On receiving the UL-MAP message from the access point 120, the access terminal 110 can detect ranging codes used for initial ranging, a modulation method, coding scheme information, a ranging channel, and a ranging slot. The access terminal 110 randomly selects a ranging code from among the ranging codes used for initial ranging to transmit the selected ranging code to the access point 120, and transmits the selected ranging code to the access point 120 through a selected ranging slot (S21). Transmission power for transmitting the ranging code in the step S21 has the minimum transmission power level.

On receiving a random ranging code from the access terminal 110 through a random ranging slot, the access point 120 transmits a ranging response message that is success information indicating a success of receiving the ranging code to the access terminal 110 (S22). Also, the access point 120 transmits a UL-MAP message including a CDMA allocation information element for the access terminal 110 to the access terminal 110 (S23). In this instance, the CDMA allocation information element includes an uplink bandwidth through which the access terminal 110 transmits a ranging request message.

On receiving the UL-MAP message from the access point 120, the access terminal 110 detects the CDMA allocation information element included in the UL-MAP message, and uses the uplink bandwidth to transmit the ranging request message together with the ranging code to the access point 120 (S24). On receiving the ranging request message from the access terminal 110, the access point 120 sets the status value to be 'Success' and transmits a ranging response message including the status value to the access terminal 110 so as to notify the successful receipt of the message (S25).

The above-described general ranging process performs ranging between the access terminal 110 and the access point 120 without using a packet access router, and a method for performing ranging in the system having the packet access router 130 so as to improve coverage and to increase data throughputs of the portable Internet system according to an exemplary embodiment of the present invention will now be described. A cell configuration including the packet access router 130 for the ranging operation of the access terminal 110 will now be described with reference to FIG. 4.

Figure 4:
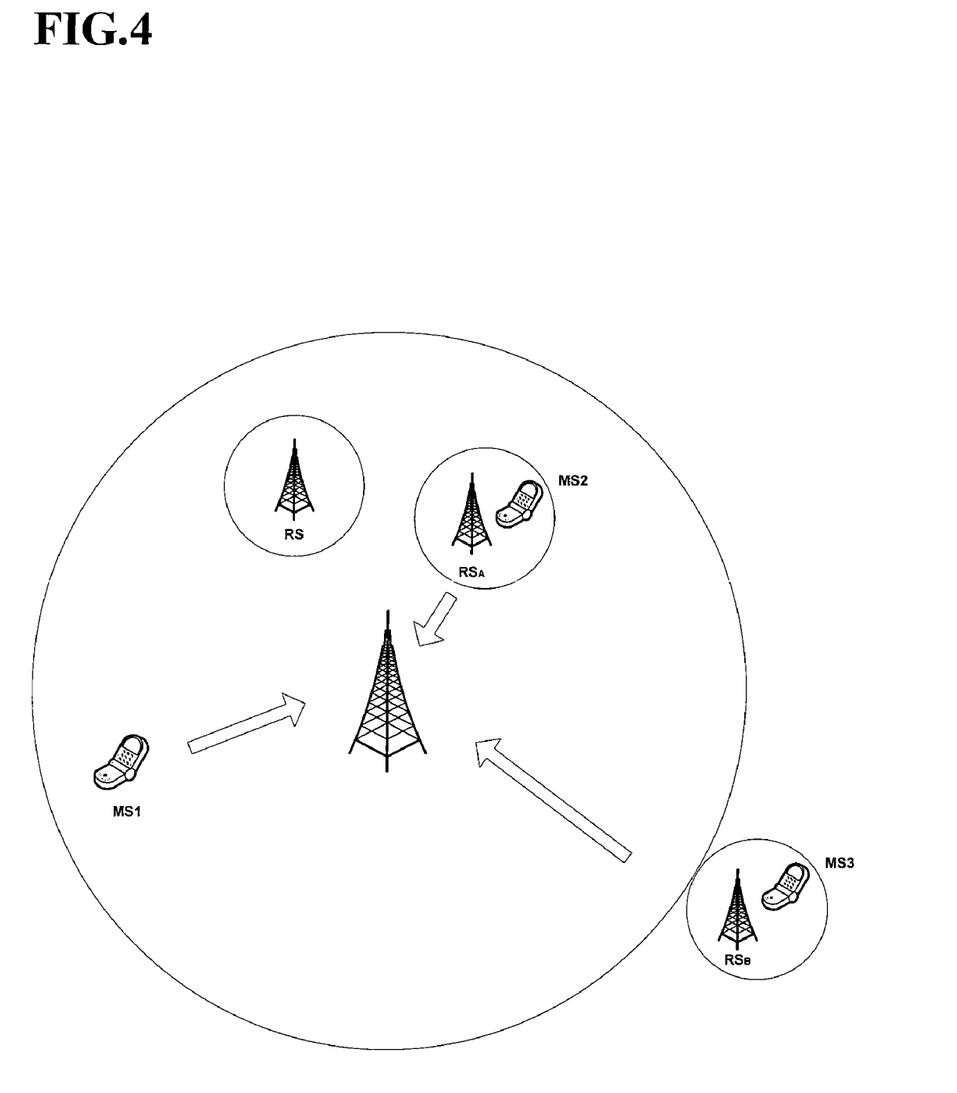
FIG. 4 shows a cell configuration according to an exemplary embodiment of the present invention.

FIG. 4 shows a cell configuration according to an exemplary embodiment of the present invention.

As shown in FIG. 4, the packet access router 130 in the portable Internet system according to the exemplary embodiment of the present invention enlarges the cell coverage region by performing the function of a repeater and an amplification function, and performs the function of controlling the access terminal 110 in the region of the packet access router 130 so as to improve the data throughput. It is known that the packet access router 130 of FIG. 4 enlarges the coverage of the existing MMR-BS (multi hop BS).

However, when attempting to improve the coverage and the throughput of the portable Internet system, it is needed for the packet access router 130 to simply amplify the data in the radio section and to transmit the amplified data, control efficient data communication between the access point 120 and the access terminal 110, and control the status caused when the access terminal 110 moves, to thereby solve the problem of the existing portable Internet system without the packet access router 130 and to generate improved performance.

Therefore, the portable Internet system with the packet access router 130 in the exemplary embodiment of the present invention can perform a better initial access and a periodical ranging process so as to accurately transmit data to the access point 120 irrespective of the condition of whether the access terminal 110 is provided within the region of the packet access router 130 or outside. To perform the ranging process, it is required to have an improved frame structure related to the ranging code transmission method, and the frame structure will now be described.

In the exemplary embodiment of the present invention, two hops of the access point 120 that are not passed through a plurality of packet access routers, the packet access router 130, and the access terminal 110 will be provided as a reference for description.

FIG. 5A to FIG. 5D are frame configuration diagrams according to an exemplary embodiment of the present invention.

Figure 5A:
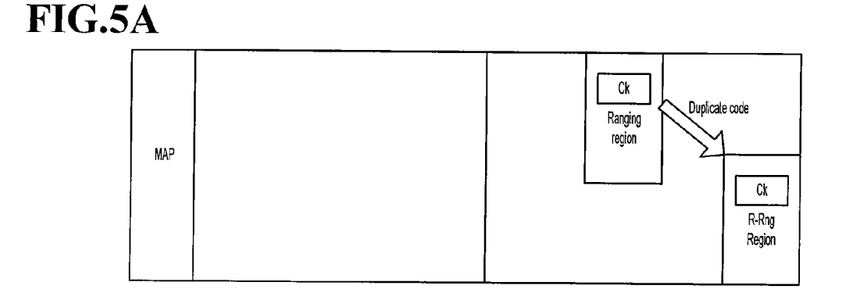
FIG. 5A to FIG. 5D are frame configuration diagrams according to an exemplary embodiment of the present invention.
Figure 5B:
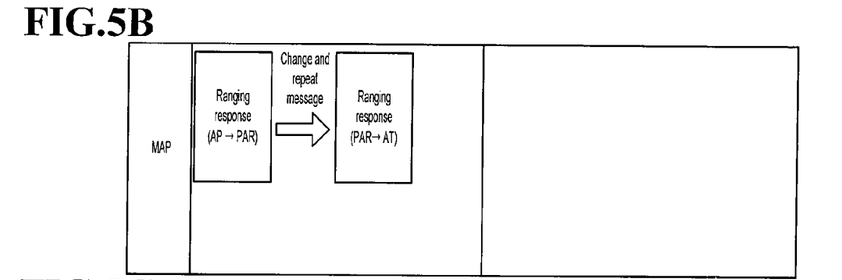
Figure 5C:
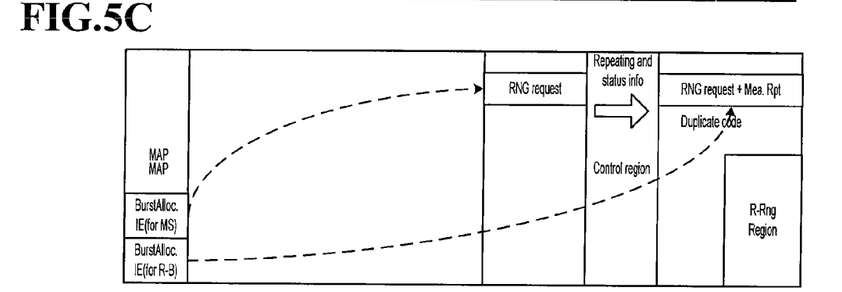
Figure 5D:
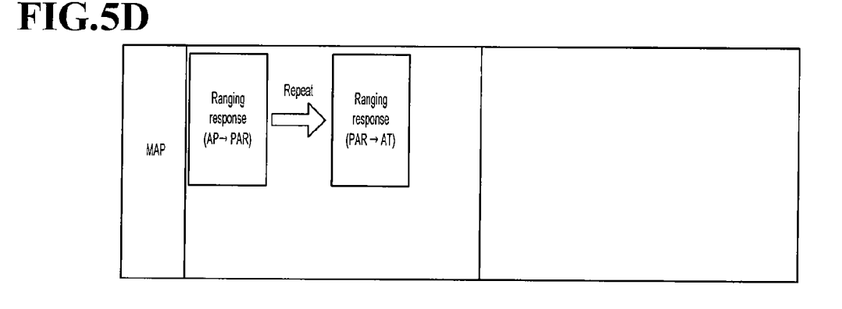

Referring to FIG. 5A to FIG. 5D, FIG. 5A shows the case in which the packet access router 130 searches the uplink frame to find a ranging code provided by the access terminal 110, includes a ranging code that is a copy of the found ranging code in the same frame, and transmits the frame to the access point 120 in the ranging region for the packet access router 130. FIG. 5B shows a stage for transmitting a ranging response message on the ranging code received from the access point 120 to the access terminal 110. FIG. 5C shows the case in which the packet access router 130 receives the ranging response message, and updates and transmits the ranging response message by using ranging control information caused by a channel estimation result on the ranging code received from the access terminal 110, and FIG. 5D shows the case in which the access terminal 110 receives the modified ranging response message and performs a timing/frequency/power control.

When the ranging code is transmitted to the access point 120 from the access terminal 110 of the portable Internet system, a determination basis is needed in order for the access point 120 to determine whether the access terminal 110 directly transmitted the ranging code to the uplink, or the ranging code is transmitted through the packet access router 130. Therefore, as shown in FIG. 5A, the packet access router 130 searches the ranging code that is provided to the uplink frame by the access terminal 110, duplicates the ranging code as the same ranging code, and repeats the same in the same frame with different spaces.

That is, when the access terminal 110 transmits the ranging code through the packet access router 130, the packet access router 130 transmits the ranging code of the packet access router 130 that is the same as the code of the access terminal 110. The access point 120 detects the same two transmitted ranging codes to detect that the access terminal 110 is provided in the region of the packet access router 130.

In this instance, the two same ranging codes must be in the same frame, and the ranging code of the access terminal 110 and the ranging code of the packet access router 130 are allocated to different spaces so that they may be identified. In detail, the packet access router 130 transmits the ranging code having the same code number as that of the ranging code received in a separate repeating ranging region within the frame, and acquires ranging region allocation information on the repeating ranging region for the packet access router 130 through the uplink-MAP information element (IE).

As shown in FIG. 5B, the packet access router 130 transmits a ranging response message on the ranging code received from the access point 120 to the access terminal 110. That is, when access point 120 broadcasts a ranging response message (RNG-RSP) to the packet access router 130 and simultaneously allocates a repeating bandwidth thereto, the packet access router 130 receives a ranging response message from the access point 120 based on the repeating bandwidth. The packet access router 130 corrects the ranging response message by using ranging control information on the stored ranging code and broadcasts the corrected ranging response message to the access terminal 110.

As shown in FIG. 5C, the packet access router 130 receives the ranging response message, updates the ranging response message by using the channel estimation result on the ranging code received from the access terminal 110 and corresponding ranging control information, and transmits the updated ranging response message to the access point 120. That is, on receiving the data, the packet access router 130 generates channel information and status information on the access terminal 110, loads the same in the uplink frame, and transmits them to the access point 120.

In this instance, when the access terminal 110 is initially accessed, the access point 120 allocates an uplink bandwidth and a repeating bandwidth for the ranging request message to the packet access router 130, and the packet access router 130 repeats the access terminal 110 through the allocated uplink bandwidth and the repeating bandwidth. For this, a MAP IE for allocating a repeating ranging region to which the packet access router 130 will provide the ranging code will now be described with reference to FIG. 6.

Figure 6:
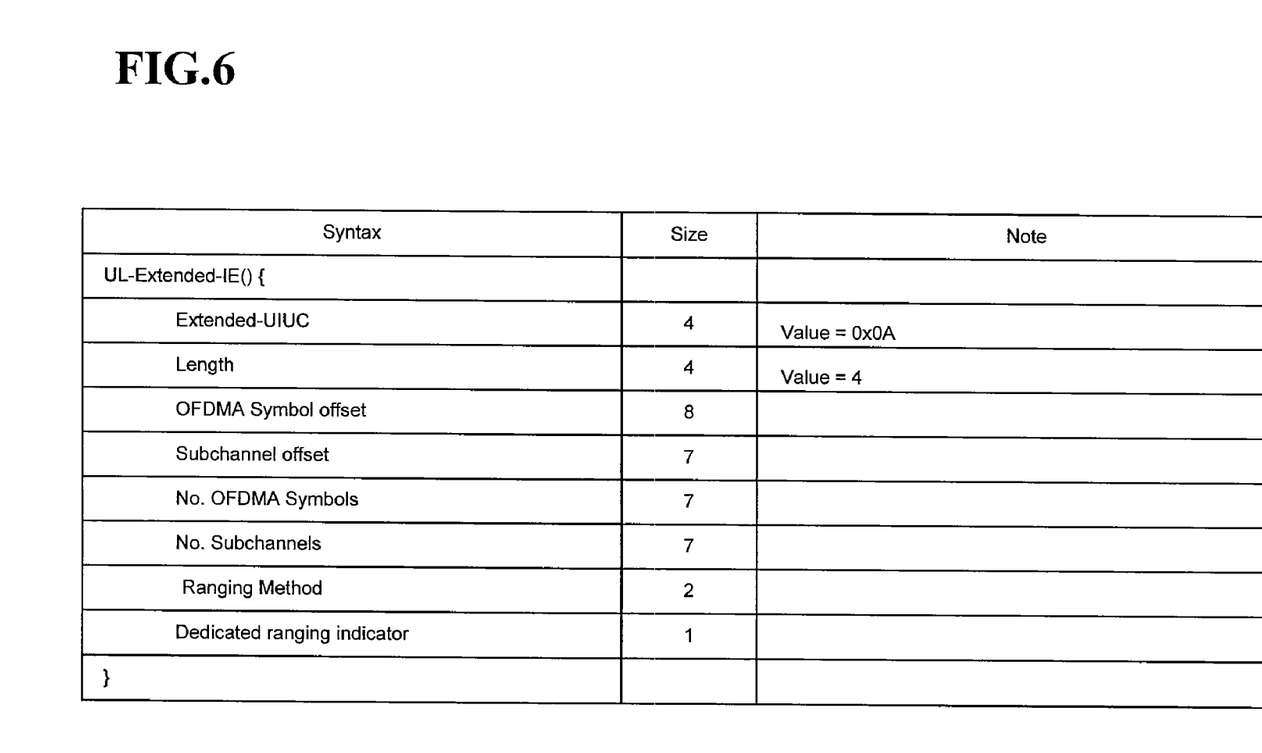
FIG. 6 shows a bandwidth allocation IE format for a portable Internet-based packet access router according to an exemplary embodiment of the present invention.

FIG. 6 shows an exemplified bandwidth allocation IE format for the portable Internet-based packet access router according to an exemplary embodiment of the present invention.

As shown in FIG. 6, the bandwidth allocation IE format includes an extended 4-bit uplink interval usage code (UIUC), a 4-bit length, an 8-bit OFDMA symbol offset, a 7-bit subchannel offset, a 7-bit OFDMA symbol number, a 7-bit subchannel number, a 2-bit ranging method, and a 1-bit dedicated ranging indicator. The respective elements of the bandwidth allocation IE format are well known to a person skilled in the art, and no detailed description will be provided herein.

As shown in FIG. 5D, the access terminal 110 receives the corrected ranging response message from the packet access router 130 to control the timing, frequency, or power.

A ranging method will now be described with reference to FIG. 7 and FIG. 8. A process for broadcasting the ranging response message will be described with reference to FIG. 7.

Figure 7:
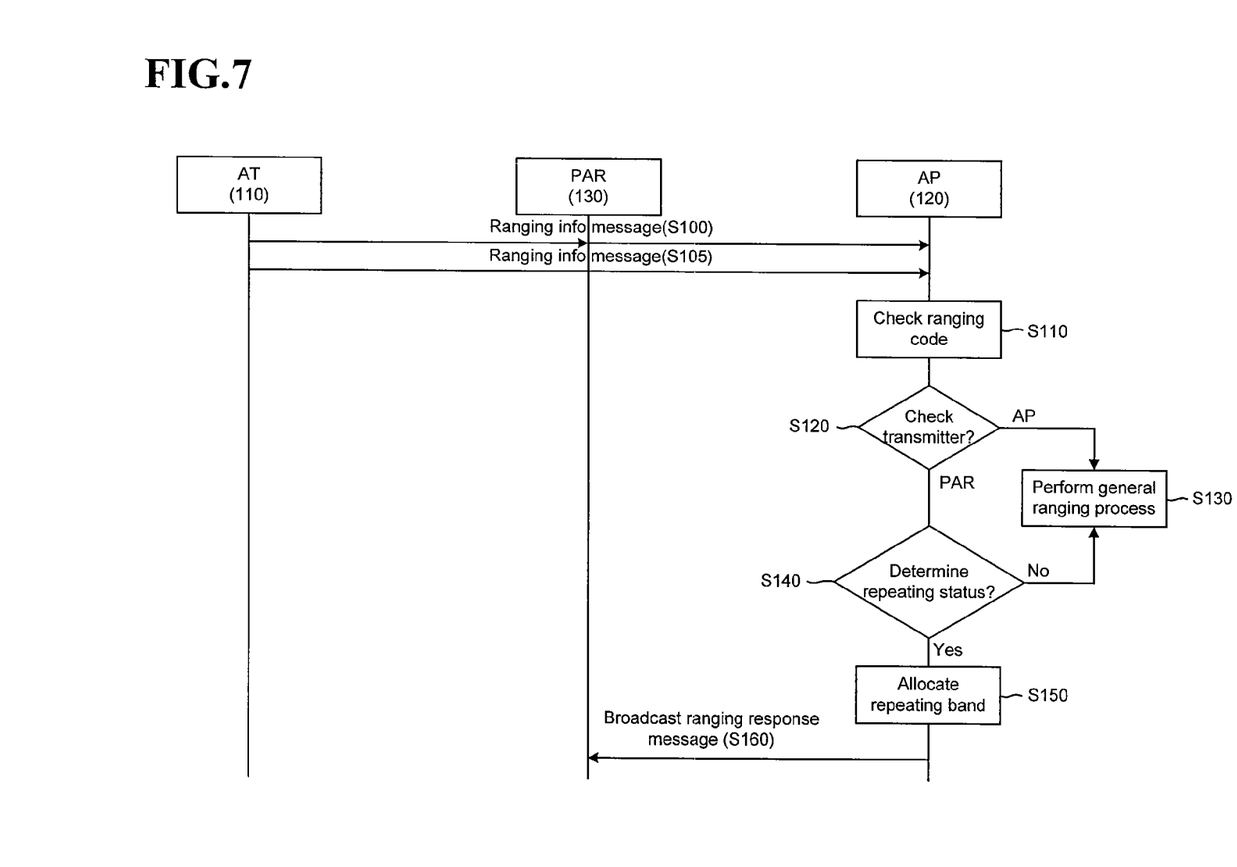
FIG. 7 is a flowchart for broadcasting a ranging response message according to an exemplary embodiment of the present invention.

FIG. 7 is a flowchart for broadcasting a ranging response message according to an exemplary embodiment of the present invention.

As shown in FIG. 7, the access point 120 receives a ranging information message from the access terminal 110 or the packet access router 130 (S100, S105). In this instance, the ranging information message is included in the uplink frame and is received by the access point 120, and it includes a ranging code. For ease of description, the ranging code when directly receiving a ranging information message from the access terminal 110 will be referred to as a first ranging code, and the ranging code when receiving a ranging information message from the packet access router 130 will be referred to as a second ranging code.

On receiving the ranging information message, the access point 120 checks the ranging code in the message (S110), and checks which unit transmitted the ranging information message (S120). That is, when the ranging information message includes the first ranging code and the second ranging code, it is checked that the packet access router 130 transmitted the ranging information message, and when the ranging information message includes the first ranging code, it is checked that the access terminal 110 transmitted the ranging information message.

When the access terminal 110 transmitted the ranging information message, the conventional ranging process is performed as described in the portable Internet system (S130). However, when the packet access router 130 transmitted the ranging information message, the access point 120 determines whether to repeat the ranging of the access terminal 110 through the packet access router 130 (S140). Determination on the repeating status will be described in detail with reference to FIG. 8.

When the ranging of the access terminal 110 is not repeated through the packet access router 130 according to the determination result in the step S140, the conventional ranging process is performed in a like manner of the step S130. However, when the ranging of the access terminal 110 is performed through the packet access router 130, a repeating bandwidth is allocated (S150), and the ranging response message including information on the repeating bandwidth is broadcast to the packet access router 130 (S160).

A ranging processing method performed by the access point 120 including the step of determining the ranging repeating status will now be described with reference to FIG. 8.

Figure 8:
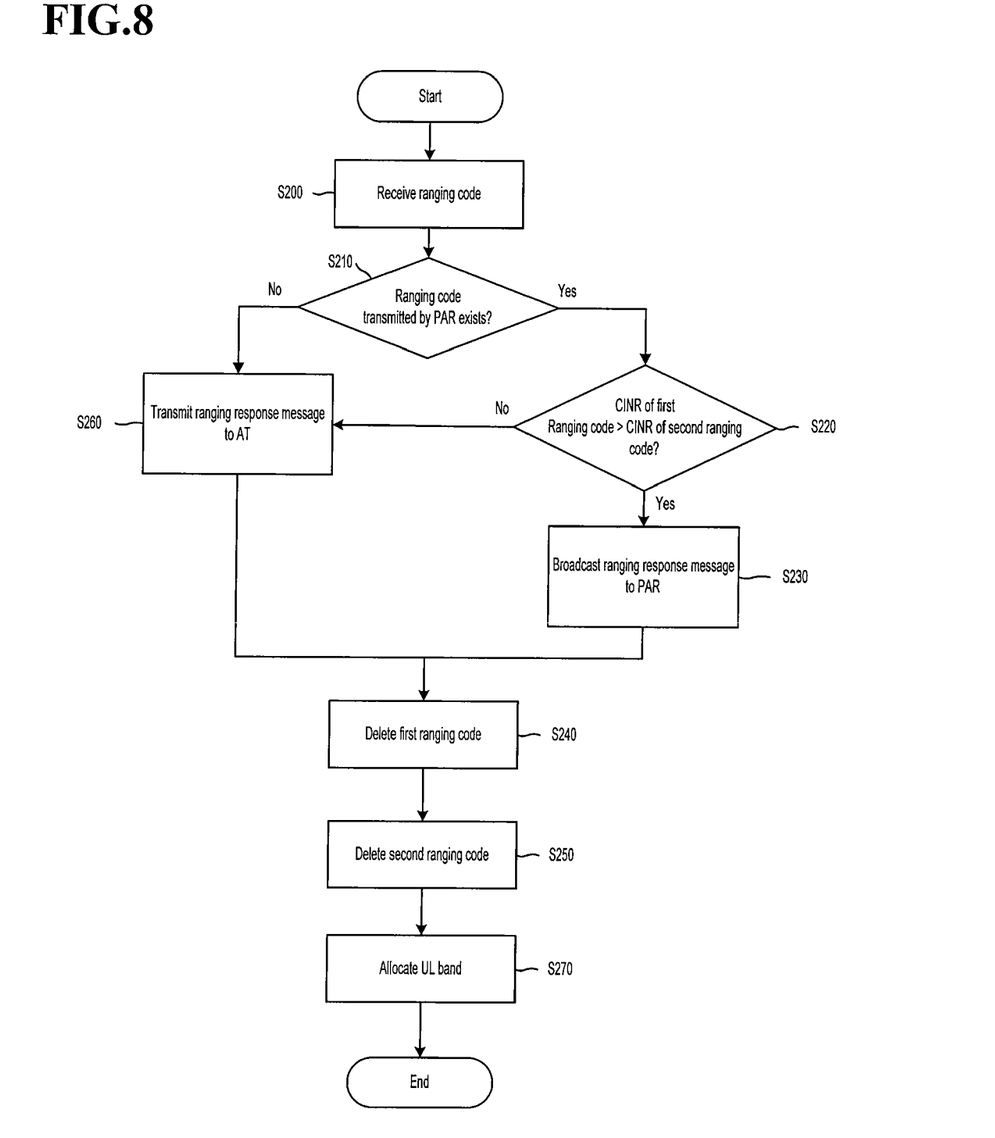
FIG. 8 is a flowchart for an access point to process ranging according to an exemplary embodiment of the present invention.

FIG. 8 is a flowchart for processing ranging by an access point according to an exemplary embodiment of the present invention.

As shown in FIG. 8, the access point 120 checks whether the code transmitted by the packet access router 130 is provided in the packet access router 130 bandwidth request space before performing CDMA allocation on the ranging code (S200). When there is no code, the ranging process is performed as described in the general IEEE 802.16 specification. However, when there is a code transmitted by the packet access router 130, the access point 120 searches the ranging codes of the access terminal 110 (S210).

When the same ranging code is found in the access terminal 110 region, the access point 120 compares the ranging codes' carrier to interference noise ratios (CINRs) to determine whether it will be desirable to transmit the data through the packet access router 130. That is, the CINR value of the first ranging code and the CINR value of the second ranging code are compared (S220).

When it is determined that it is desirable to transmit the data without passing through the packet access router 130 according to the comparison of the CINR values (e.g., the CINR value of the first ranging code<the CINR value of the second ranging code), the ranging response message is directly broadcast to the access terminal 110 (S230). In this instance, a CID of the ranging response message is set to have the format of 0xFFFF indicating that it is a general broadcasting message.

However, when it is determined that it is desirable to transmit the data through the packet access router 130 (e.g., the CINR value of the first ranging code>the CINR value of the second ranging code), a bandwidth for broadcasting and repeating the ranging response message is allocated, and the ranging response message is broadcast to the packet access router 130 through the allocated bandwidth (S260). In this instance, the ranging response message determined to be broadcast is broadcast by using a broadcasting ID for the packet access router 130 other than a general broadcasting ID.

In this instance, the broadcasting ID for the packet access router 130 can be selected and designated in the multicasting ID region defined in the current standard. The packet access router 130 searches the corresponding ranging code received in the previous frame on the ranging response message having a repeating broadcasting ID, and corrects the detailed field according to the estimation channel status. The packet access router 130 broadcasts the corrected ranging response message to the allocated repeating bandwidth section. The access point 120 deletes the first ranging code information provided from the access terminal 110 and the second ranging code information provided from the packet access router 130 (S240, S250), and stands by for receiving the ranging code.

When the access terminal 110 transmits the initial access ranging code, the access point 120 transmits the ranging request message to the access terminal 110, and allocates an uplink bandwidth for repeating the ranging on the access terminal 110 (S270). When the access terminal 110 transmits an initial access burst, the packet access router 130 repeating the initial access burst transmits an initial access ranging request message and a channel estimation report message given between the access terminal 110 and the packet access router 130 to the access point 120.

In this instance, the access point 120 can perform power control of the access terminal 110 by applying an appropriate AMC level and can detect the status of the access terminal 110 provided in the region of the packet access router 130 based on the channel estimation report between the access terminal and the packet access router provided by the packet access router 130.

For the above-described operation, the configuration of the packet access router 130 according to the exemplary embodiment of the present invention will be described with reference to FIG. 9.

Figure 9:
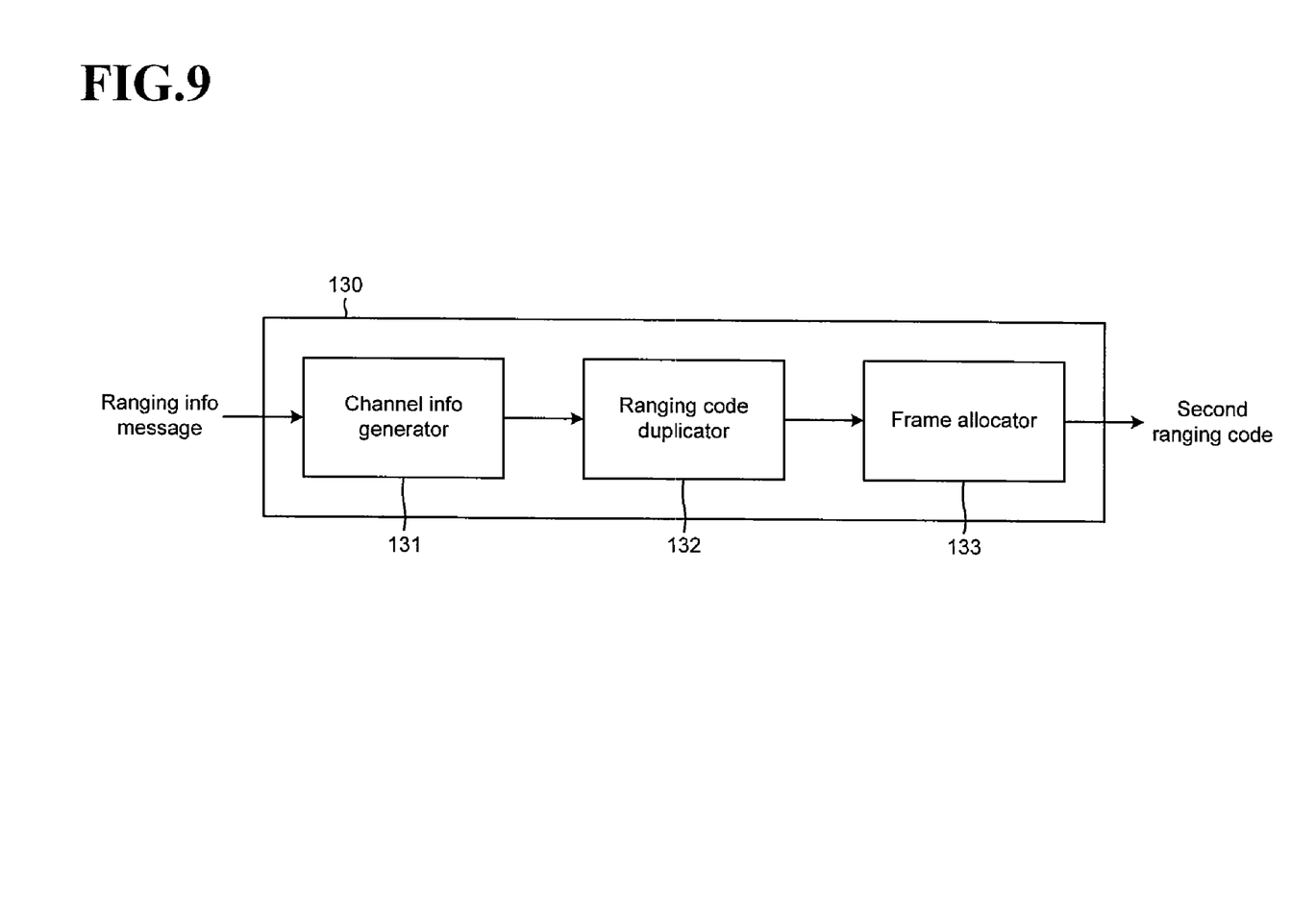
FIG. 9 is a configuration diagram for a packet access router according to an exemplary embodiment of the present invention.

FIG. 9 is a configuration diagram for a packet access router according to an exemplary embodiment of the present invention.

As shown in FIG. 9, the packet access router 130 includes a channel information generator 131, a code duplicator 132, and a frame allocator 133.

The channel information generator 131 receives a ranging information message from the access terminal 110, and generates channel information and status information on the access terminal 110. The code duplicator 132 duplicates the ranging code from the access terminal 110 to generate a ranging code, and the frame allocator 133 allocates a second duplicated ranging code to another space (R-Rng Region in FIG. 5A) in the uplink frame.

In this instance, the program for realizing functions corresponding to the above-noted configuration of the exemplary embodiment of the present invention or the recording medium having recorded the program is included in the scope of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the exemplary embodiment, in the mobile communication system, the packet access router controls ranging by using the ranging code, and hence, the coverage by the access point is improved and the data throughput is enhanced.

Also, system performance can be improved through the efficient power control for the access terminal out of the access point region.

What is claimed is:

1. A method for ranging an access terminal by using a packet access router in a mobile communication system, the method comprising:
    receiving a ranging information message from the packet access router at an access point, the ranging information message including a first ranging code and a second ranging code, the first ranging code being provided by the access terminal and the second ranging code being provided by the packet access router;
    determining whether the ranging information message received includes the second ranging code provided by the packet access router;
    broadcasting a ranging response message to the packet access router if the second ranging code is determined to be included in the ranging information message received,
    wherein the step of broadcasting the ranging response message comprises:
    determining whether to allocate repeating bandwidth for ranging the access terminal through the packet access router;
    allocating repeating bandwidth to the packet access router when it is determined to allocate repeating bandwidth for ranging the access terminal through the packet access router; and
    broadcasting the ranging response message including information on the allocated repeating bandwidth to the packet access router,
    wherein the step for determining whether to allocate repeating bandwidth for ranging the access terminal through the packet access router comprises:
    extracting the first ranging code and the second ranging code from the ranging information message;
    comparing the carrier to interference noise ration (CINR) of the extracted first ranging code and a CINR of the extracted second ranging code;
    and determining whether to allocate the repeating bandwidth according to the comparison result.

2. The method of claim 1, wherein repeating of the packet access router is determined and a ranging repeating bandwidth is allocated to the packet access router when the CINR of the second ranging code is less than the CINR of the first ranging code.

3. The method of claim 1, wherein a ranging response message including an ID indicating a broadcasting message is generated, and the same message is broadcast to the access terminal when the CINR of the second ranging code is greater than the CINR of the first ranging code.

4. The method of claim 1, wherein the determining step comprises
    determining that the ranging information message is received from the packet access router when the first ranging code and the second ranging code are included in the same frame of the ranging information message.

5. The method of claim 1, wherein information on the allocated ranging repeating bandwidth is included in the code division multiple access (COMA) allocation information element (IE) of an uplink MAP (UL-MAP).

* * * * *